W. M. SCOTT.
TREE PROTECTION.
APPLICATION FILED JAN. 19, 1915.
1,130,546.
Patented Mar. 2, 1915.
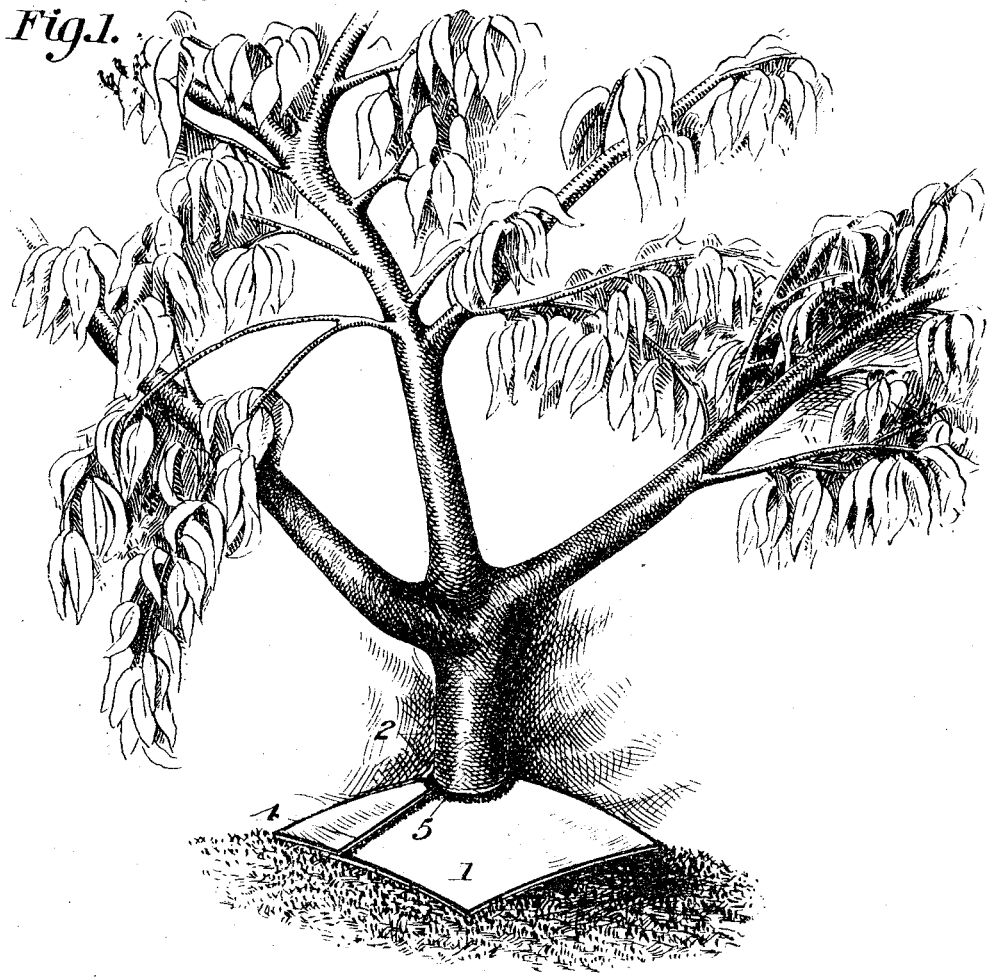
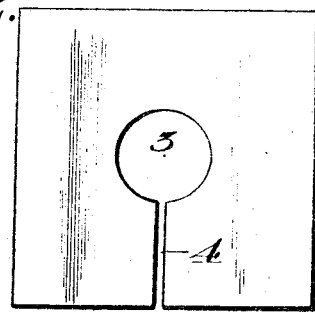
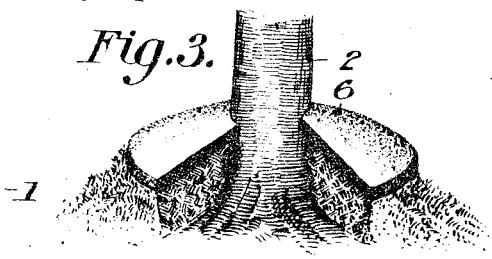

UNITED STATES PATENT OFFICE.

WILLIAM M. SCOTT, OF BALTIMORE, MARYLAND.

TREE PROTECTION.

1,130,546.  Specification of Letters Patent.  Patented Mar. 2, 1915.

Original application filed September 30, 1914, Serial No. 864,308. Divided and this application filed January 19, 1915. Serial No. 3,151.

*To all whom it may concern:*

Be it known that I, WILLIAM M. SCOTT, a citizen of the United States, residing in the city of Baltimore, in the State of Maryland, have invented certain new and useful Improvements in Tree Protection, of which the following is a specification, reference being had therein to the accompanying drawing.

This invention relates to tree guards and has special reference to structures for protecting trees from the injurious effects of insects and the like.

The subject-matter herein revealed is disclosed in my pending application filed September 30th, 1914, Serial No. 864,308; and the present application constitutes a true and legal division of that earlier-filed application.

The primary object of the invention is to provide a protecting structure which comprises instrumentalities for application to the trunks of trees (and more especially fruit-trees) at the ground-line portion thereof, and which structure though impervious to insects is so constituted as not to interfere with the growth of the tree to which it is attached.

Another object is to provide a comparatively inexpensive tree-protecting structure for application to fruit-trees (particularly peach-trees) and which is to be attached thereto in such manner as not only to act as a barrier to insects but, also, to have the capacity of expanding or enlarging with the growth of the tree.

A more specific object is to provide a tree-encircling instrumentality for peach-trees which though flexible is none the less impenetrable to insects known as "borers," and the attachment of which to the tree is effected in such manner as to preclude the migration of such insects from above ground to the roots and underground portions of the trunk, and whereby these borers, after hatching from eggs, are prevented from reaching the moist and tender bark of the trunk and crown of the roots at or below the surface of the soil where the borers, by instinct and habit, seek to enter.

Another and subsidiary object within the contemplation of my invention is to utilize the means, thus provided, for keeping the base and crown of trees from freezing in the winter.

This invention in general seeks to provide means which, from an operative standpoint, have, in practical use, been found to possess a high degree of efficiency and which, structurally considered, are of the greatest simplicity.

Other objects and advantages will in part be obvious from the annexed drawings while others will be pointed out in the following description.

The invention resides broadly in the features of construction and in the aggroupment of the components thereof, all as will be exemplified in the structure hereinafter set forth, and the scope of application of which will be indicated in the claims hereto appended.

In the accompanying drawings, forming a part of this disclosure, some of the possible utilizations and embodiments of the invention are illustrated by way of example, it being manifest that other possible utilizations and embodiments (employing the underlying principles of my invention) fall within the spirit thereof and within the objects contemplated thereby.

In these drawings: Figure 1 is a view of a tree with a protecting-device (constructed in accordance with one embodiment of the invention) applied thereto; Fig. 2 is a detail view of the protecting-device, detached; and Fig. 3 is a fragmentary view in perspective, and partly in section, of a somewhat different embodiment.

Referring to the drawings, it will be noted that 1 designates a protector-instrumentality or guard-element which, in this instance, is shown as a mat or pad encircling the trunk of a tree at the ground-line portion thereof. This mat-instrumentality may be constructed of any desired dimensions and form. It is made of any suitable material or substance which is flexible, more or less pliable or expansive, and absolutely impervious to the insects. Preferably and as shown, the mat is closely fitted around the trunk 2 of a tree at the ground-line portion thereof. It is preferably so formed and dimensioned as completely to cover the soil over a radius of several inches from the bark of the tree and to have a surface-contact with the ground substantially throughout its area.

In the embodiment of the invention exemplified in Figs. 1 and 2, the protector-instrumentality is preferably made of tar-paper, tarred paper, tarred burlap, felt, or other suitable fabric. It is, in this instance, provided with a central opening 3 of such diametral dimensions and shape as to conform to the tree-trunk to which it is to be applied. As shown, it outstands from the tree and overlies the soil sufficient to constitute an effectual barrier to the borer. To facilitate its application to the tree, the protector-mat is, in this instance, cut or slit radially, at 4, from its outer edge to the edge of the opening. To attach it to the tree-trunk, I employ, in this particular exemplification, a viscous substance 5 which, being spread along the edges of the central opening, securely conjoins it and the tree and, by reason of the fact that, when it is applied, it is in a plastic condition, preferably, it effects an absolute sealing of the protector-element to the tree. For sealing the openings around the trunk and along the lapped edges of the mat, any viscous substance that will not crack or dissolve away during the course of a summer and that will not injure the tree, may be used, such as soft pitch, coal-tar (with the injurious acids and oils distilled off), asphalt (with a low melting point), wax, pine tar, etc. In practice, I have found that the residue from the distillation of coal-tar reduced to a melting point of 108° to 115° F., constitutes a very satisfactory material for this purpose. Not only can the insects not penetrate the element itself, but the viscous material precludes their migration from the upper surface of the mat, or from the surface of the tree, downward between the bark of the tree and the mat. I have, in this way, provided an outstanding protector-instrumentality which is flexible and impenetrable to the insects, and have combined therewith means for sealing the instrumentality to the tree, the sealing mass being likewise impervious to such insects. I find, in practice, that it is advantageous to mound the soil a few inches high around the tree, as shown in Fig. 1, and this gives the protector-mat a roof-like slope.

In Fig. 3, I have shown, as another exemplification of my invention, a guard 6 formed entirely, or substantially, of a viscous substance, such as asphalt, tarry substances, or the like, and having the characteristics of being impenetrable to the insects and, also, of being pliable, flexible, or expansible so that it shall not injure the tree in its growth, etc. In this instance, the mass is laid around the base of the tree; it is pressed or otherwise manipulated to force it closely around the surface of the tree so as to effect an absolute and impenetrable sealing thereof to the tree.

By these different forms of structure, have provided a simple and effective barrier to the migration of borers to the roots, etc., of trees, like the peach, plum, apple, etc.

In my aforementioned earlier-filed case, I have disclosed and claimed the method of attaching the protector to the tree, etc. The present case is directed to the structure, itself.

It is also a feature of my improved protector-structure that, by reason of the fact that it covers the tree-trunk at a rather tender point, the protector prevents the base and crown thereof from freezing.

As many changes can be made in the construction and many widely different embodiments of this invention can be made, and numerous methods of carrying it into effect are possible, without departing from the spirit thereof, it is intended that all matter contained in the foregoing description and shown in the accompanying drawings shall be interpreted as illustrative and not in any limiting sense.

What I claim is:

1. A tree protector composed of flexible material constructed to lie in surface contact with the ground substantially throughout its area, and means for sealing said protector expansibly to the tree at the ground-line portion thereof.

2. A tree-protector composed of an expansible tree-encircling protector-element impenetrable to insects and formed to lie in surface contact with the ground substantially throughout its area and having an impenetrably sealed and expansible adherence to the tree.

3. A structure for protecting trees including a tree-encircling protector-instrumentality composed of flexible material constructed to lie in surface contact with the ground substantially throughout its area, and means initially in a plastic condition for expansibly sealing said instrumentality to a tree at the ground-line portion thereof and thereby effecting a holding of the instrumentality against the ground.

4. A tree-protecting structure including a flexible soil-covering and tree-encircling protector-mat constructed to lie in surface contact with the ground substantially throughout its area and impenetrable to insects; and a viscous, insect-impenetrable mass thereon for sealing the mat expansibly to the tree at the ground-line portion thereof and for holding the mat against the ground.

5. A tree-protecting structure including a flexible tree-encircling protector-instrumentality composed in part of paper impenetrable to fruit-tree borers and constructed to lie in surface contact with the ground substantially throughout its area, and, in part, of a viscous material for expansibly sealing the instrumentality to the tree at the ground-line portion thereof and which is itself impenetrable to the borers.

6. A tree-protecting structure including a flexible and insect-impenetrable tree-encircling element constructed to lie in surface contact with the ground substantially throughout its area and provided with a central opening conforming approximately to the diametral dimensions of a tree and cut from its outer edge to the edge of the opening, and a viscous mass spread on the element at the edges of the opening and extending over the edges of the cut for expansibly sealing the element to the tree at the ground-line portion thereof and for holding the same in intimate contact with the ground.

In testimony whereof I affix my signature in presence of two witnesses.

WILLIAM M. SCOTT.

Witnesses:
JAMES ATKINS,
EDMUND H. PARRY.